(12) United States Patent
Lee et al.

(10) Patent No.: US 7,786,228 B2
(45) Date of Patent: Aug. 31, 2010

(54) METHOD FOR OPTIMIZATION OF PROCESS BY ADJUSTMENT OF INITIATOR IN POLYMERIZATION SYSTEM

(75) Inventors: Hokyung Lee, Daejeon (KR); Sujin Lee, Daejeon (KR); Seungyoung Park, Daejeon (KR); Jongku Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 895 days.

(21) Appl. No.: 11/655,150

(22) Filed: Jan. 19, 2007

(65) Prior Publication Data
US 2007/0238844 A1    Oct. 11, 2007

(30) Foreign Application Priority Data
Apr. 10, 2006    (KR) .................. 10-2006-0032136

(51) Int. Cl.
*C08F 2/00*    (2006.01)
*B01J 19/00*    (2006.01)
(52) U.S. Cl. .................. 526/61; 526/59; 526/344; 422/138
(58) Field of Classification Search ............ 526/59, 526/61, 344; 422/138
See application file for complete search history.

(56) References Cited

U.S. PATENT DOCUMENTS

| | | | | |
|---|---|---|---|---|
| 3,257,375 A | * | 6/1966 | Norwood | 526/61 |
| 3,991,258 A | * | 11/1976 | Beckingham et al. | 526/59 |
| 4,752,640 A | * | 6/1988 | Tomishima et al. | 526/61 |
| 6,440,674 B1 | | 8/2002 | Misra et al. | |

FOREIGN PATENT DOCUMENTS

KR    10-1992-0020465    11/1992

* cited by examiner

*Primary Examiner*—Fred M Teskin
(74) *Attorney, Agent, or Firm*—McKenna Long & Aldridge LLP

(57) ABSTRACT

Disclosed herein is an optimization method in a polymerization system in which heat is generated during the polymerization with an initiator. The optimization method includes the steps of measuring the heat generation amount based on the composition of the initiator in the polymerization system to previously set the relationship between the initiator composition and the heat generation amount, measuring the heat removal amount based on the temperature of a coolant in a cooling system of the polymerization system to previously set the relationship between the coolant temperature and the heat removal amount, calculating the initiator composition allowable at a predetermined coolant temperature to previously set the relationship between the coolant temperature and the initiator composition, and measuring the temperature of the coolant before and/or during the polymerization to adjust the composition of the initiator added at the measured temperature to the optimum condition, thereby decreasing the reaction time, and therefore, improving the productivity.

11 Claims, 4 Drawing Sheets

METHOD FOR OPTIMIZATION OF PROCESS BY ADJUSTMENT OF INITIATOR IN POLYMERIZATION SYSTEM

This application claims the benefit of Korean Patent Application No. 10-2006-0032136, filed on Apr. 10, 2006, which is hereby incorporated by reference for all purposes as if fully set forth herein.

FIELD OF THE INVENTION

The present invention relates to an optimization method through adjustment of an initiator in a polymerization system, and, more particularly, to an optimization method in a polymerization system in which heat is generated during the polymerization with an initiator, wherein the optimization method comprises the steps of measuring the heat generation amount based on the composition of the initiator in the polymerization system to previously set the relationship between the initiator composition and the heat generation amount, measuring the heat removal amount based on the temperature of a coolant in a cooling system of the polymerization system to previously set the relationship between the coolant temperature and the heat removal amount, calculating the initiator composition allowable at a predetermined coolant temperature to previously set the relationship between the coolant temperature and the initiator composition, and measuring the temperature of the coolant before and/or during the polymerization to adjust the composition of the initiator added at the measured temperature to the optimum condition, thereby decreasing the reaction time, and therefore, improving the productivity.

BACKGROUND OF THE INVENTION

Most polymer resins are manufactured by polymerizing monomers using initiators. The polymerization may be generally classified into an endothermic reaction and an exothermic reaction. For example, it is necessary to remove reaction heat generated in an exothermic reaction, such as polyvinyl chloride (PVC) polymerization, thereby improving the efficiency of the reaction.

Factors affecting the productivity are various in a practical process for manufacturing polymer resin by polymerization. In polymerization accompanied by heat generation, controlling the reaction temperature is one of the most important factors. Consequently, a cooling system for removing reaction heat is essential in an exothermic polymerization system. A typical example of the cooling system is illustrated in FIG. 1.

Referring to FIG. 1, an exothermic polymerization system 10 includes a reactor 20 in which polymerization of monomers is carried out and a cooling system comprising a jacket 30 mounted at the wall of the reactor 20 and a reflux condenser 40 mounted at the top end of the reactor 20. A coolant circulates through the jacket 30 and the reflux condenser 40 to remove heat of polymerization generated in the reactor 20. The reflux condenser 40 allows vapor existing at the upper end of the reactor 20 to contact the coolant so as to lower the temperature of the reactor 20 to a predetermined range of temperature.

Consequently, in the exothermic polymerization system 10 as shown in FIG. 1, the temperature of the coolant in the jacket 30 and the reflux condenser 40 is controlled to the predetermined range of temperature, thereby accomplishing optimum operating conditions.

Meanwhile, in the exothermic polymerization system, the heat generation amount may be decided by various factors. Typical examples of the factors may be polymerization degree and polymerization rate. These factors have close relation to the reaction temperature and the addition amount of the initiator. Especially, there is a complex correlation therebetween. Consequently, it is possible to improve the productivity through the adjustment of the related factors.

In connection with this matter, U.S. Pat. No. 6,440,374 discloses a technology for setting optimum reaction conditions by operating a cooler surrounding a reactor in a reaction system such that the temperature measured by a temperature sensor, which is mounted between the reactor and the cooler, is equal to a predetermined temperature level. This technology is the most generally considerable productivity improving method. However, this technology has a problem in that the temperature of cooling water must be controlled depending upon heat of reaction. Especially, in a polymerization system in which normal industrial water is used as the cooling water, it is necessary to use an additional apparatus for controlling the temperature of the cooling water and energy for operating the additional apparatus. As a result, the costs are increased although the productivity is improved.

On the other hand, Korean Unexamined Patent Publication No. 1993-019701 discloses a polymerization method of adding an initiator and a monomer in a reactor in polymerization conditions using a monomer supply profile and an initiator supply profile. Specifically, the supply profiles decide the ratio of monomer concentration to initiator concentration according to polymerization kinetics and the reaction temperature, the initiator concentration and the monomer concentration, and polymerization degree selected for a polymer. Also, the ratio of the monomer concentration to the initiator concentration decided according to the kinetics relationship is changed, by a polymerization efficiency factor, so as to obtain polymerization degree of approximately uniform concentration during the polymerization, thereby obtaining a polymer having uniform polymerization degree. This method is a technology for obtaining a polymer having uniform polymerization degree, i.e., a technology for adjusting the initiator concentration and the monomer concentration under certain conditions. However, information about the improvement of the productivity in the exothermic polymerization system in which the removal of heat of reaction is important is not taught or suggested in the above-described publication.

Consequently, a technology for improving the productivity by reducing the energy consumption amount while using the conventional polymerization system is in great demand. In connection with this case, it may be preferable to have a technology for controlling the temperature of the polymerization system by using normal industrial water as a coolant without additionally controlling the temperature of the coolant.

For instance, a polyvinyl chloride (PVC) resin is manufactured by polymerization accompanied by heat generation. The preferable polymerization temperature of the PVC resin is 40 to 80° C. depending upon the polymerization degree thereof. Consequently, the reaction temperature is controlled by directly using industrial water, which is not additionally cooled, as a coolant. The temperature of the cooling water (industrial water) is not additionally controlled. As a result, the temperature of the cooling water may be decided by seasonal factors. For example, the temperature of the cooling water is low in the winter season, and therefore, the amount of heat removable from the reactor through 1-time circulation (the heat removal amount) is large. In the summer season, on the other hand, the heat removal amount is relatively small. In the same seasonal conditions, the heat removal amount is relatively large in the forenoon.

Consequently, the existing exothermic polymerization system is constructed in a structure in which the improvement of the productivity according to the temperature difference of the cooling water is not expected although the difference of the heat removal amount is changed depending upon the temperature of the cooling water. Specifically, the polymerization rate may be increased (the reaction time may be decreased) to improve the productivity in the cooling water temperature condition in which the heat removal amount is large. However, the conventional art does not provide a technical proposal in connection with the above-described matter.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention found that the temperature of cooling water is measured at predetermined time intervals in an exothermic polymerization system so as to previously measure the heat removal amount, and the composition of an initiator is changed on the basis of the previously measured heat removal amount such that the polymerization occurs at the optimum reaction rate, thereby improving the productivity without controlling the temperature of the coolant. The present invention has been completed based on these findings.

In accordance with one aspect of the present invention, the above and other objects can be accomplished by the provision of an optimization method in a polymerization system in which polymerization is carried out by the introduction of an initiator and heat is generated during the polymerization, wherein the optimization method comprises the steps of: (a) measuring the heat generation amount based on the composition of the initiator in the polymerization system to previously set the relationship between the initiator composition and the heat generation amount; (b) measuring the heat removal amount based on the temperature of a coolant in a cooling system of the polymerization system to previously set the relationship between the coolant temperature and the heat removal amount; (c) calculating the initiator composition allowable at a predetermined coolant temperature based on the relationships of Step (a) and Step (b) to previously set the relationship between the coolant temperature and the initiator composition; and (d) measuring the temperature of the coolant before and/or during the polymerization to adjust the composition of the initiator added at the measured temperature to the optimum condition, thereby decreasing the reaction time, and therefore, improving the productivity.

In the polymerization system in which heat is generated during the polymerization ('exothermic polymerization system'), the heat generation amount of the polymerization depending upon the initiator composition and the heat removal amount of the system based on the temperature of the coolant are previously measured so as to derive the relationship between the temperature of the coolant and the composition of the initiator which shows the optimum operating efficiency through the equalization of the heat generation amount and the heat removal amount. Consequently, the temperature of the coolant in the exothermic polymerization system is measured at predetermined time intervals, and the optimum composition of the initiator is introduced based on the relationship, thereby increasing the reaction rate. The reaction rate is inversely proportional to the reaction time. In other words, the increase of the reaction rate means the decrease of the reaction time. Consequently, the productivity is improved by the decrease of the reaction time.

In the optimization method according to the present invention, the composition of the initiator is changed, without changing the temperature of the coolant, to improve the operating efficiency. Consequently, it is not necessary to use an additional apparatus for changing the temperature of the coolant and energy for operating the additional apparatus. Specifically, the optimum operating condition is accomplished by only changing the composition of the initiator. As a result, the productivity can be improved without increasing the costs, unlike the conventional art.

Generally, the polymerization rate depends upon the amount of the initiator. Preferably, the initiator composition may be the amount of the initiator supplied into the polymerization system. When the initiator is a mixture of two or more compounds, and the initiator composition may be the mixed ratio of the mixture and/or the amount of the mixture. For example, when the initiator is a mixture of two compounds, and the reaction rate is increased by the increase of the mixed ratio of one compound, the reaction rate may be controlled by the adjustment of the mixed ratio.

When the amount of the initiator is increased so as to increase the reaction rate, on the other hand, the reaction heat generation amount is also increased. As a result, the polymerization may be overloaded. In this case, the temperature of the coolant passing through the reactor is also increased. According to the present invention, the optimum amount of the initiator at the relatively high coolant is decided again based on this coolant temperature so as to control the amount of the initiator actually supplied into the polymerization system, thereby decreasing the heat generation amount.

Preferably, the heat generation amount may be calculated by measuring the flow rate of the coolant in the cooling system and the difference between the inlet and outlet temperatures of the coolant at the time of introducing a predetermined amount of the initiator.

As previously described with reference to FIG. 1, a typical example of the cooling system may include a jacket mounted to the wall of a reactor, in which monomers to be polymerized and the initiator are introduced, for cooling the reactor through the circulation of the coolant, and a reflux condenser for circulating the coolant through the reactor to condense gas-phase component, and therefore, cool the reactor.

In this case, the heat removal amount of the jacket may be different from the heat removal amount of the reflux condenser, and the heat removal amount of the jacket and the heat removal amount of the reflux condenser are measured to calculate the heat removal amount of the cooling system, which is the sum of the heat removal amount of the jacket and the heat removal amount of the reflux condenser. For instance, a graph illustrating the heat removal amount (indicated by circular points and diamond points) which was actually measured on the basis of the temperature of cooling water and the heat removal amount (indicated by a solid line and a dotted line) which was mathematically calculated on the basis of the temperature of cooling water in an arbitrary cooling system comprising a jacket and a reflux condenser is shown in FIG. 3. As shown in FIG. 3, the heat removal amount of the jacket and the reflux condenser has different behaviors. The heat removal amount of the jacket and the heat removal amount of the reflux condenser are summed to obtain the total heat removal amount of a specific cooling system depending upon the temperature of the cooling water. Also, it can be seen that the heat removal amount of the jacket and the heat removal amount of the reflux condenser have the same behaviors as the mathematically calculated values although the heat removal amount of the jacket and the heat removal amount of the reflux condenser in the cooling system have deviations as compared to the actually measured values.

Preferably, the relationship between the coolant temperature and the initiator composition may be set to an initiator composition at which the polymerization can be carried out in the shortest time at a predetermined temperature.

The temperature of the coolant at Step (d) may be measured at predetermined time intervals. For example, the temperature of the coolant may be measured at 1- to 120-minute intervals. Alternatively, the temperature of the coolant may be continuously measured in real time.

The polymerization system according to the present invention is not particularly restricted so long as the initiator is introduced to carry out the polymerization and heat is generated during the polymerization. A typical example of the polymerization system may be a polyvinyl chloride (PVC) polymerization system.

In the PVC polymerization system, the optimum reaction condition is accomplished at a temperature of 40 to 80° C. depending upon the polymerization degree thereof. Consequently, the PVC polymerization system uses cooling water, such as industrial water, the temperature of which has not been adjusted as the coolant and a mixture of two kinds of compounds as the initiator. As the amount of the mixed initiators is increased, the reaction rate is increased, and the heat generation amount is also increased. Generally, a batch polymerization process, in which a group of polymerization is completed a predetermined period of time after the introduction of the initiator, is carried out in the PVC polymerization system. In the batch polymerization process, the introduction conditions of the mixed initiators are differently set in consideration of the half-value periods of the initiators. Also, time necessary for carrying out a 1-time batch polymerization process may be different depending upon the polymerization degree and the temperature of the cooling water. For example, the 1-time batch polymerization process may be carried out for approximately a few hours to several tens of hours.

FIG. 2 is a graph illustrating the relationship between the temperature of cooling water actually measured and the recipes (concentration) of initiators introduced during 9-month operation of an arbitrary PVC polymerization system. Since industrial water has been used as the cooling water, the temperature of the cooling water has been changed within the range of approximately 5 to 30 degrees due to the seasonal factors for 9 months (January to September). Especially, the cooling water is brought into contact with the atmosphere during the circulation of the cooling water. Consequently, the temperature of the circulated cooling water is changed depending upon the temperature of the atmosphere.

As can be seen from FIG. 2, the approximately same or similar amount of the initiators were supplied, while the initiators had deviation depending upon the temperature of the cooling water, in the condition that the finally mixed ratio of the initiator components was uniformly maintained. The reason why the deviation of the initiator amount was large at relatively high temperature is that the initiator amount was arbitrarily reduced based on the experience of an operator when the temperature of the cooling water is increased. Consequently, the initiators were not supplied at the optimum reaction conditions according to the change in temperature of the cooling water.

According to the present invention, on the other hand, the temperature of the cooling water is measured at predetermined time intervals so as to decide the optimum amount of the initiators, and therefore, the reaction rate is optimized. In this way, the initiator amount is automatically controlled through monitoring of the temperature of the cooling water, whereby the optimum operation condition is always accomplished even when the temperature of the atmosphere changes within a day or the temperature of the atmosphere is changed due to the seasonal factors.

In accordance with another aspect of the present invention, there is provided an exothermic polymerization system for performing the above-described optimization method.

According to the present invention, the exothermic polymerization system includes a monomer supply unit, an initiator supply unit, a reactor in which polymerization of monomers is carried out, a cooling system for lowering the temperature of the reactor, and a control system for measuring the temperature of a coolant in the cooling system to adjust the composition of an initiator from the initiator supply unit into the reactor.

This polymerization system may be easily constructed by mounting a sensor for detecting the temperature of the coolant in the conventional exothermic polymerization system and further including a controlling apparatus for controlling the composition of an initiator supplied from the initiator supply unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 4:
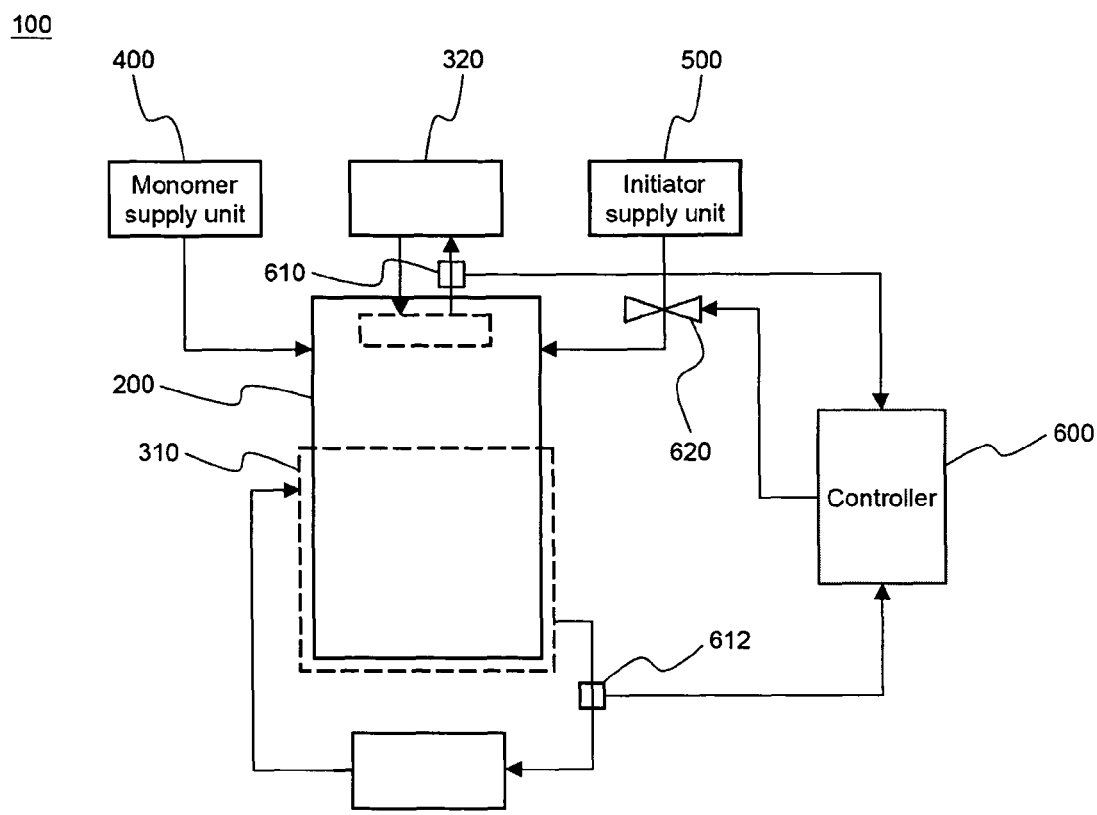
FIG. 4 is a typical view illustrating the construction of a PVC polymerization system according to a preferred embodiment of the present invention.

FIG. 4 is a typical view illustrating the construction of a polyvinyl chloride (PVC) polymerization system according to a preferred embodiment of the present invention.

Referring to FIG. 4, the PVC polymerization system 100 includes a reactor 200, a cooling system comprising a jacket 310 and a reflux condenser 320, a monomer supply unit 400, an initiator supply unit 500, and a control system. The control system includes temperature sensors 610 and 612 for measuring the temperature of cooling water in the jacket 310 and reflux condenser 320, respectively, an initiator amount adjustor 620 for adjusting the amount of an initiator, and a controller 600 for receiving detection signals from the temperature sensors 610 and 612 and transmitting an operating signal to the initiator amount adjustor 620 based on information inputted thereto.

Specifically, the controller 600 controls the initiator amount adjustor 620 based on information about optimum relationship between the temperature of cooling water and the amount of an initiator, which has been previously inputted to the controller 600.

Figure 5:
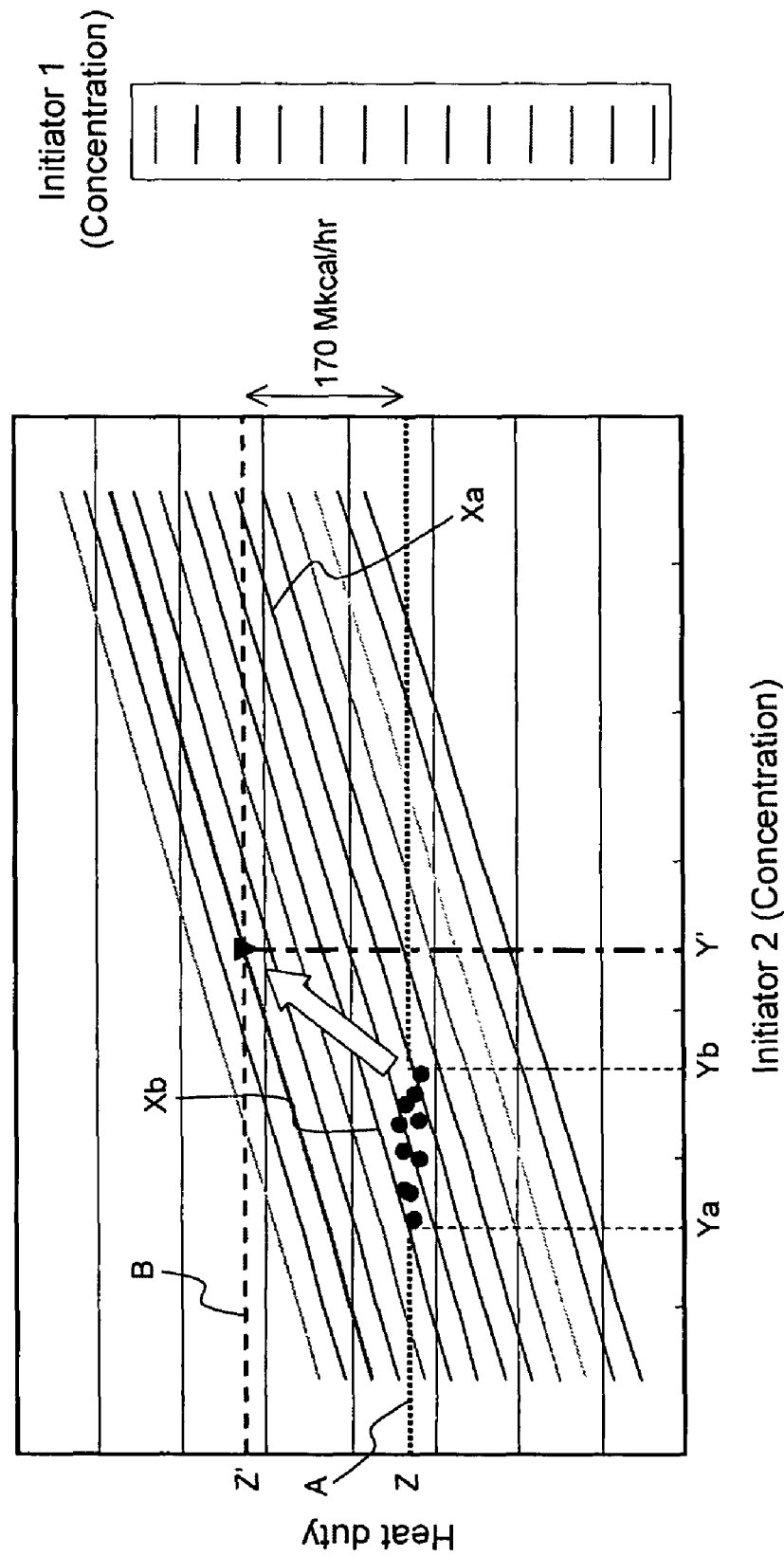
FIG. 5 is a graph illustrating an experimental example in which the initiator amount is changed by the conventional method and the initiator amount is changed by a method according to the present invention in an arbitrary PVC polymerization system using two kinds of compounds (Initiator 1 and Initiator 2) as the initiators.

FIG. 5 is a graph illustrating an experimental example in which the initiator amount is changed by the conventional method and the initiator amount is changed by a method according to the present invention in an arbitrary PVC polymerization system using two kinds of compounds (Initiator 1 and Initiator 2) as the initiators.

Referring to FIG. 5, the arbitrary PVC polymerization system was operated in the condition that the temperature of cooling water was Tc. In this condition, the amount of initiators supplied during the operation of the PVC polymerization system was between line Xa and line Xb (difference of 10 ppm per line) for Initiator 1 and between Ya and Yb (difference of 20 ppm per unit graduation) for Initiator 1 (see black circles). The amount of heat generated in the PVC polymerization, which was converted from the amount of initiators, was point Z of line A (difference of 100 Mkcal/hr per unit graduation).

Figure 1:
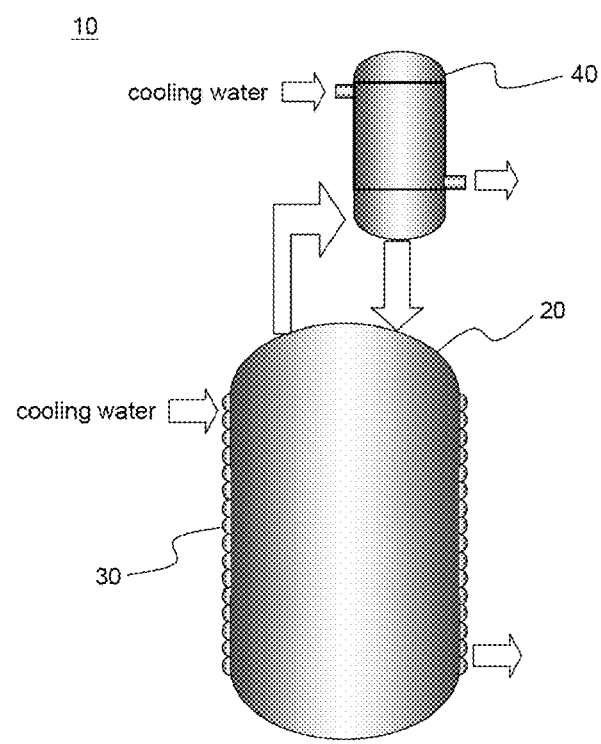
FIG. 1 is a typical view illustrating the construction of a conventional exothermic polymerization system including a cooling system.
Figure 2:
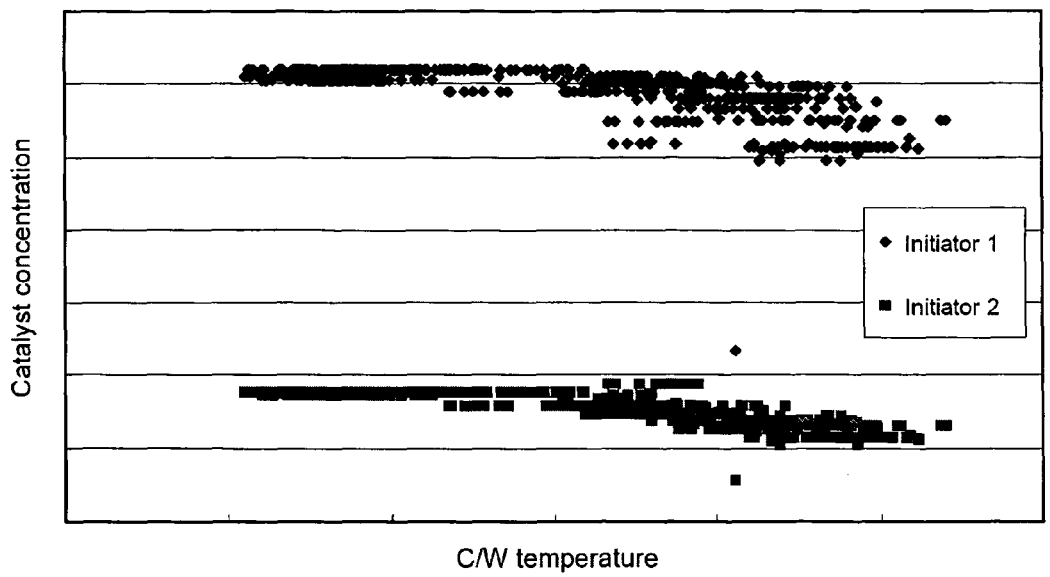
FIG. 2 is a graph illustrating the relationship between the temperature of cooling water actually measured and the recipes (concentration) of initiators introduced during 9-month operation of an arbitrary polyvinyl chloride (PVC) polymerization system.
Figure 3:
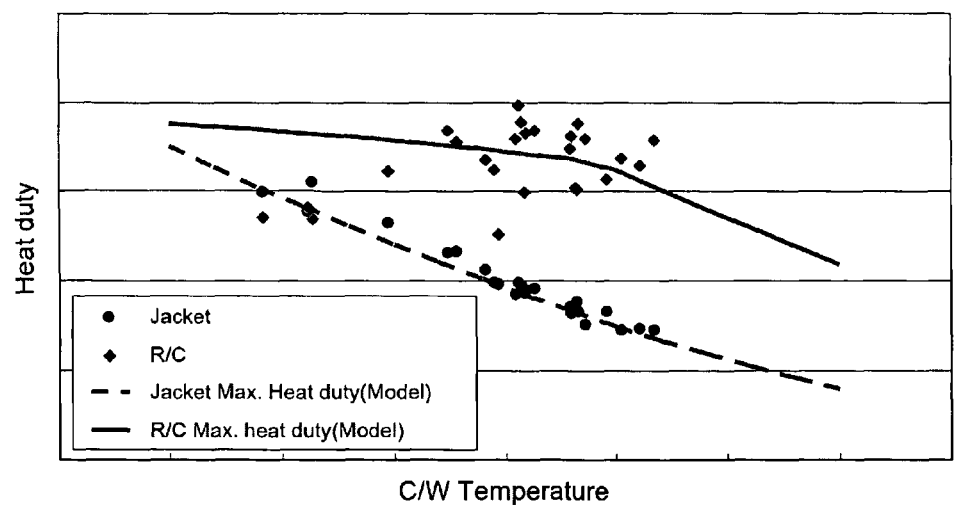
FIG. 3 is a graph illustrating the heat removal amount which was actually measured on the basis of the temperature of cooling water and the heat removal amount which was arithmetically calculated on the basis of the temperature of cooling water in an arbitrary cooling system comprising a jacket and a reflux condenser.

In the graph illustrating the relationship between the cooling water temperature and the heat removal amount as shown in FIG. 3, however, the maximum amount of heat removable by the cooling system of the PVC polymerization system (the maximum heat removal amount) was point Z' of line B in the condition that the temperature of cooling water was Tc. Consequently, it can be clearly seen that the operation of the PVC polymerization system was inefficiently carried out with the heat removal amount corresponding to 170 Mkcal/hr remaining as compared to the heat generation amount in the same cooling water temperature condition. In consideration of this respect, the initiator amount may be changed to the initiator amount corresponding to line B indicating the heat removal amount at point Z' in the condition that the temperature of cooling water is Tc. For example, when Initiator 1 is set by increasing red-color concentration, Initiator 2 may be adjusted with a concentration of Y' (see blue-color inverted triangle). This means that the amount of the two initiators increases by 40 ppm at the maximum as compared to the conventional operating condition. The increase of the initiator amount means the increase of the polymerization rate. Consequently, it is possible to greatly reduce the reaction time for the same production rate.

INDUSTRIAL APPLICABILITY

As apparent from the above description, the present invention is characterized in that only the composition of the initiator supplied into the reactor is changed according to the temperature of a coolant without remarkably modifying the existing apparatus and adjusting the temperature of the coolant, and therefore, polymerization is carried out at the optimum reaction rate. Consequently, the present invention has the effect of decreasing the reaction time, and therefore, improving the productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optimization method in a polymerization system in which polymerization is carried out by the introduction of an initiator and heat is generated during the polymerization, wherein the optimization method comprises the steps of:
   (a) measuring the heat generation amount based on the composition of the initiator in the polymerization system to previously set the relationship between the initiator composition and the heat generation amount;
   (b) measuring the heat removal amount based on the temperature of a coolant in a cooling system of the polymerization system to previously set the relationship between the coolant temperature and the heat removal amount;
   (c) calculating the initiator composition allowable at a predetermined coolant temperature based on the relationships of Step (a) and Step (b) to previously set the relationship between the coolant temperature and the initiator composition; and
   (d) measuring the temperature of the coolant before and/or during the polymerization to adjust the composition of the initiator added at the measured temperature to the optimum condition, thereby
   decreasing the reaction time, and therefore, improving the productivity.

2. The optimization method according to claim 1, wherein the initiator composition is the amount of the initiator supplied into the polymerization system.

3. The optimization method according to claim 1, wherein the initiator is a mixture of two or more compounds, and the initiator composition is the mixed ratio of the mixture and/or the amount of the mixture.

4. The optimization method according to claim 1, wherein the heat generation amount is calculated by measuring the flow rate of the coolant in the cooling system and the difference between the inlet and outlet temperatures of the coolant at the time of introducing a predetermined amount of the initiator.

5. The optimization method according to claim 4, wherein the cooling system includes
   a jacket mounted to the wall of a reactor, in which monomers to be polymerized and the initiator are introduced, for cooling the reactor through the circulation of the coolant, and
   a reflux condenser for circulating the coolant through the reactor to condense gas-phase component, and therefore, cool the reactor.

6. The optimization method according to claim 5, wherein the heat removal amount of the cooling system is the sum of the heat removal amount of the jacket and the heat removal amount of the reflux condenser.

7. The optimization method according to claim 1, wherein the relationship between the coolant temperature and the initiator composition is set to an initiator composition at which the polymerization can be carried out in the shortest time at a predetermined temperature.

8. The optimization method according to claim 1, wherein the temperature of the coolant at Step (d) is measured at 1- to 120-minute intervals or is continuously measured in real time.

9. The optimization method according to claim 1, wherein the polymerization system is a polyvinyl chloride (PVC) polymerization system.

10. The optimization method according to claim 9, wherein the PVC polymerization system uses cooling water the temperature of which has not been adjusted as the coolant, and a mixture of two kinds of compounds as the initiator.

11. The optimization method according to claim 10, wherein the adjustment of the initiator amount is decided based on the temperature of the cooling water measured at 1- to 10-minute intervals.

\* \* \* \* \*